US009613344B2

(12) United States Patent
Lee et al.

(10) Patent No.: US 9,613,344 B2
(45) Date of Patent: Apr. 4, 2017

(54) GAME SUPPLY SYSTEM USING PERSONAL AREA NETWORK, A GAME SUPPLY METHOD THEREBY, A SERVICE SERVER, A RELAY METHOD, A MOBILE PHONE AND A STORAGE MEANS

(75) Inventors: Jeong Hoon Lee, Seoul (KR); Jeong Min You, Seoul (KR); In Hwan Kim, Seoul (KR); Sung Mu Son, Seoul (KR)

(73) Assignee: SK PLANET CO., LTD. (KR)

( * ) Notice: Subject to any disclaimer, the term of this patent is extended or adjusted under 35 U.S.C. 154(b) by 734 days.

(21) Appl. No.: 13/126,974

(22) PCT Filed: Dec. 4, 2008

(86) PCT No.: PCT/KR2008/007154
§ 371 (c)(1),
(2), (4) Date: Apr. 29, 2011

(87) PCT Pub. No.: WO2010/050641
PCT Pub. Date: May 6, 2010

(65) Prior Publication Data
US 2011/0207528 A1    Aug. 25, 2011

(30) Foreign Application Priority Data

Oct. 29, 2008  (KR) .......................... 10-2008-0106398

(51) Int. Cl.
*G06F 21/00*   (2013.01)
*G06Q 20/14*   (2012.01)
(Continued)

(52) U.S. Cl.
CPC ........... *G06Q 20/145* (2013.01); *H04L 67/38* (2013.01); *H04W 8/24* (2013.01); *H04W 12/06* (2013.01); *H04W 88/04* (2013.01)

(58) Field of Classification Search
USPC ........................................................ 705/56
See application file for complete search history.

(56) References Cited

U.S. PATENT DOCUMENTS 6,241,612 B1 *  6/2001  Heredia .................. A63F 13/12
                                                        463/40
8,108,312 B2 *  1/2012  Natsuno .......................... 705/59
(Continued)

FOREIGN PATENT DOCUMENTS

JP       2002-306836    10/2002
KR       1020010097079  11/2001
(Continued)

*Primary Examiner* — Zeshan Qayyum
(74) *Attorney, Agent, or Firm* — Bakerhostetler LLP

(57) ABSTRACT

The present invention relates to a game supply system and method using a personal area network, a service server, a game relay method, a mobile communication terminal, and a storage medium. The game supply system includes a first end terminal (170) connected to a first mobile communication terminal (150) through a first personal area network (160) and configured to execute game data received from a game server (120). The first mobile communication terminal (150) is connected to a service server (110) through a mobile communication network (140) and configured to relay data between the first end terminal and the service server. The service server is connected to the game server through the mobile communication network, and is configured to authenticate the first end terminal and the first mobile communication terminal and request the service server to provide requested game data. The game server provides requested game data to the service server.

8 Claims, 5 Drawing Sheets

(51) Int. Cl.
*H04W 8/24* (2009.01)
*H04L 29/06* (2006.01)
*H04W 12/06* (2009.01)
*H04W 88/04* (2009.01)

(56) References Cited

U.S. PATENT DOCUMENTS

| | | | | |
|---|---|---|---|---|
| 2002/0154558 A1* | 10/2002 | Urata | ............... | G06Q 20/12 |
| | | | | 365/200 |
| 2007/0105607 A1* | 5/2007 | Russell | ............... | G06F 11/0709 |
| | | | | 463/1 |
| 2007/0179897 A1* | 8/2007 | Andersson | ............... | 705/59 |
| 2008/0220878 A1* | 9/2008 | Michaelis | ............... | 463/42 |
| 2009/0052380 A1* | 2/2009 | Espelien | ............... | H04L 45/306 |
| | | | | 370/328 |
| 2009/0222900 A1* | 9/2009 | Benaloh | ............... | H04L 9/3213 |
| | | | | 726/9 |

FOREIGN PATENT DOCUMENTS

| | | |
|---|---|---|
| KR | 1020020048552 | 6/2002 |
| KR | 1020050073672 | 7/2005 |
| KR | 1020060066294 | 6/2006 |

\* cited by examiner

GAME SUPPLY SYSTEM USING PERSONAL AREA NETWORK, A GAME SUPPLY METHOD THEREBY, A SERVICE SERVER, A RELAY METHOD, A MOBILE PHONE AND A STORAGE MEANS

TECHNICAL FIELD

The present invention relates, in general, to a game supply system and method using a personal area network, a service server, a game relay method, a mobile communication terminal and a storage medium, and, more particularly, to a technology in which an end terminal that can be connected to a personal area network may receive game data from the game server of a mobile communication network via a mobile communication terminal and a service server and may play a game with the mobile communication terminal, or another mobile communication terminal or another end terminal connected to another personal area network.

BACKGROUND ART

In compliance with numerous and varied user requirements, mobile communication terminals, each equipped with a game function, are provided. Such a mobile communication terminal equipped with a game function is implemented as a one-person game which allows a user to enjoy the game with an artificial intelligence character. Such a game is problematic in that the user easily gets bored with programmed rules that the artificial intelligent character uses when coping with the user.

In order to solve this problem, a network game, in which a plurality of mobile communication terminals is connected to each other through a mobile communication network and a plurality of users plays a game in a singular game environment, has been proposed. Since a network game is executed in such a way that a plurality of users interacts with each other, games are not repetitive, and thus users interests are stimulated. However, such a network game is problematic in that, since respective mobile communication terminals are used while making connections to a mobile communication network, communication fees may be a burden, and thus it is difficult to activate a network game.

DISCLOSURE OF INVENTION

Technical Problem

Accordingly, the present invention has been made keeping in mind the above problems occurring in the prior art, and an object of the present invention is to provide a game technology, in which a plurality of mobile communication terminals and end terminals are connected through Personal Area Networks, and only a single mobile communication terminal is connected to a mobile communication network, thus reducing the burden of communication fees.

Technical Solution

In accordance with an aspect of the present invention, there is provided a game supply system using a Personal Area Network, comprising a first end terminal connected to a first mobile communication terminal through a first personal area network and configured to execute game data received from a game server; the first mobile communication terminal connected to a service server through a mobile communication network and configured to relay data between the first end terminal and the service server and to execute game data; the service server connected to the game server through the mobile communication network or a wired communication network, and configured to authenticate the first end terminal and the first mobile communication terminal and request the service server to provide game data requested by an authenticated first end terminal and an authenticated second mobile communication terminal; and the game server configured to provide game data, requested by the first end terminal and the first mobile communication terminal, to the service server.

Preferably, the game supply system may further comprise a billing server connected to the service server through the mobile communication network and configured to perform billing on the first end terminal and the first mobile communication terminal when game data is provided by the game server to the first end terminal and the first mobile communication terminal.

Preferably, the game supply system may further comprise a second end terminal connected to the second mobile communication terminal through a second personal area network and configured to execute game data received from the game server; and a second mobile communication terminal connected to the service server through the mobile communication network and configured to relay data between the second end terminal and the service server and to execute game data, wherein the service server synchronizes game data executed by the first end terminal, the second end terminal, the first mobile communication terminal and the second mobile communication terminal with each other by collecting and distributing the game data.

In accordance with another aspect of the present invention to accomplish the above object, there is provided a game supply method using a Personal Area Network, the game supply method being performed using a system in which a first end terminal and a first mobile communication terminal are connected to each other through a first personal area network and a second end terminal and a second mobile communication terminal are connected to each other through a second personal area network, and in which the first mobile communication terminal, the second mobile communication terminal, a service server and a game server are connected to each other through a mobile communication network, comprising a creation step of the first mobile communication terminal creating a game room, and the first end terminal, the second mobile communication terminal and the second end terminal requesting access to the game room from the first mobile communication terminal; an authentication step of the service server authenticating the first end terminal, the first mobile communication terminal, the second end terminal and the second mobile communication terminal; and a game execution step of the first end terminal, the first mobile communication terminal, the second end terminal and the second mobile communication terminal executing game data received from the service server.

Preferably, the creation step may comprise a first creation step of the first mobile communication terminal creating a game room; a second creation step of the first end terminal, the first mobile communication terminal and the second end terminal searching for a created game room; and a third creation step of the first end terminal, the first mobile communication terminal and the second end terminal transmitting a game room access request signal to the first mobile communication terminal.

Preferably, the authentication step may comprise a first authentication step of the first mobile communication terminal determining whether the first end terminal, the second mobile communication terminal and the second end terminal are serviceable devices; a second authentication step of, if it is determined at the first authentication step that the terminals are serviceable devices, the first end terminal, the second mobile communication terminal and the second end terminal transmitting unique ID information thereof to the first mobile communication terminal; a third authentication step of the first mobile communication terminal determining whether the unique ID information of the first end terminal, the second mobile communication terminal and the second end terminal is normal information a fourth authentication step of, if it is determined at the third authentication step that the unique ID information is normal information, the first mobile communication terminal transmitting unique ID information of the first mobile communication terminal, the first end terminal, the second mobile communication terminal and the second end terminal to the service server; a fifth authentication step of the service server determining whether the first mobile communication terminal, the first end terminal, the second mobile communication terminal and the second end terminal are in a serviceable state on a basis of the unique ID information and subscription information thereof; and a sixth authentication step of, if it is determined at the fifth authentication step that the terminals are in a serviceable state, transmitting an authentication message to the first mobile communication terminal, the first end terminal, the second mobile communication terminal and the second end terminal.

Preferably, the execution step may comprise a first execution step of the first mobile communication terminal receiving game data from the service server and transmitting the game data to the first end terminal, and the second mobile communication terminal receiving game data from the service server and transmitting the game data to the first end terminal; a second execution step of the first end terminal converting game data, generated during execution of a game, into data recognizable by the first mobile communication terminal and transferring the converted data to the first mobile communication terminal, and the second end terminal converting game data, generated during execution of a game, into data recognizable by the first mobile communication terminal and transmitting the converted data to the first mobile communication terminal; a third execution step of the first mobile communication terminal transmitting both game data generated during execution of a game and the game data received from the first end terminal to the service server, and the second mobile communication terminal transmitting game data, generated during execution of a game, and game data, received from the second end terminal, to the service server a fourth execution step of the service server converting game data, received from the first mobile communication terminal, into data recognizable by the second mobile communication terminal, transmitting the converted data to the second mobile communication terminal, converting game data, received from the second mobile communication terminal, into data recognizable by the first mobile communication terminal, and transmitting the converted data to the first mobile communication terminal; a fifth execution step of the first mobile communication terminal converting data, received from the service server, into data recognizable by the first end terminal and transmitting the converted data, and of the second mobile communication terminal converting data, received from the service server, into data recognizable by the second end terminal, and transmitting the converted data and a sixth execution step of the first mobile communication terminal, the first end terminal, the second mobile communication terminal and the second end terminal updating a game screen on a basis of the received game data.

Preferably, the game supply method may further comprise a transmission step of the first end terminal, the first mobile communication terminal, the second end terminal and the second mobile communication terminal requesting game items from the service server, and of the service server providing the game items.

Preferably, the transmission step may comprise a first transmission step of the first mobile communication terminal transferring both an item purchase request made by the first end terminal to the first mobile communication terminal, and an item purchase request generated by the first mobile communication terminal, to the service server, and of the second mobile communication terminal transferring both an item purchase request made by the second end terminal to the second mobile communication terminal, and an item purchase request generated by the second mobile communication terminal, to the service server; a second transmission step of the service server notifying the game server of the item requests, the game server transmitting requested items to the service server, and the service server transferring the items to the first mobile communication terminal and the second mobile communication terminal; and a third transmission step of the first mobile communication terminal, the first end terminal, the second mobile communication terminal and the second end terminal applying the received items to a game.

In accordance with a further aspect of the present invention to accomplish the above object, there is provided a service server for relaying games, comprising a communication unit for transmitting or receiving data through a mobile communication network; a mobile communication terminal management unit for managing information of a mobile communication terminal received through the communication unit; an end terminal management unit for managing information of an end terminal received through the communication unit; a Personal Area Network management unit for managing information of a personal area network between the mobile communication terminal and the end terminal; a game data management unit for managing game data received from the mobile communication terminal and a game server; a storage unit for storing the mobile communication terminal information, the end terminal information, the personal area network information, and the game data; and a control unit for authenticating both the mobile communication terminal and the end terminal on a basis of the mobile communication terminal information and the end terminal information, and performing control such that the game data received from the communication unit is transferred to the mobile communication terminal.

Preferably, the service server may further comprise a game data conversion unit for converting the game data received from the game server into data recognizable by the mobile communication terminal, wherein the control unit controls a conversion operation of the game data conversion unit on a basis of the mobile communication terminal information of the mobile communication terminal management unit.

Preferably, the service server may further comprise a game item management unit for managing game items received from the game server, wherein the control unit controls the communication unit such that game items corresponding to a request made by the mobile communication terminal are transferred to the mobile communication terminal.

In accordance with yet another aspect of the present invention to accomplish the above object, there is provided game relay method using a service server, comprising an authentication step of authenticating a mobile communication terminal and an end terminal; a transmission step of transmitting game data to the mobile communication terminal; and a game data reception step of receiving game data, generated during execution of a game, from the mobile communication terminal and the end terminal, and transmitting the game data to another mobile communication terminal which is executing an identical game.

Preferably, the game data reception step may be performed to convert the received game data into data recognizable by the mobile communication terminal, to which the received game data will be transmitted, and to transmit the converted data.

Preferably, the game relay method may further comprise a game item reception step of receiving game item requests made by the mobile communication terminal and the end terminal from the mobile communication terminal, receiving requested game items from the game server, and providing the game items to the mobile communication terminal.

In accordance with still another aspect of the present invention to accomplish the above object, there is provided a storage medium for storing the above game relay method using the service server in a form of a program.

In accordance with still another aspect of the present invention to accomplish the above object, there is provided a mobile communication terminal for relaying games, comprising a first communication unit for transmitting or receiving data through a mobile communication network; a second communication unit for transmitting or receiving data through a Personal Area Network; an end terminal management unit for managing information of an end terminal received through the second communication unit; a storage unit for storing the end terminal information and game data; a game data management unit for managing game data received from a service server and an end terminal; and a control unit for determining whether the end terminal is serviceable and whether unique Identification (ID) information is normal information, and controlling both the first communication unit and the second communication unit so that game data generated during execution of a game by the end terminal and the mobile communication terminal is transmitted to the service server.

Preferably, the mobile communication terminal may further comprise a game data conversion unit for converting the game data received from the service server into data recognizable by the end terminal, wherein the control unit controls an operation of the game data conversion unit on a basis of the end terminal information.

In accordance with still another aspect of the present invention to accomplish the above object, there is provided a game relay method using a mobile communication terminal, comprising an authentication step of authenticating an end terminal; a game data transmission step of receiving game data from a service server and transmitting the game data to the end terminal; and a game data reception step of receiving game data, generated during execution of a game by the end terminal, transferring the game data to the service server, and receiving from the service server game data, transferred from another mobile communication terminal, which is executing an identical game, to the service server.

Preferably, the game relay method may further comprise a game item reception step of transferring both a game item request, received from the end terminal, and a game item request, received from the mobile communication terminal, to the service server, receiving game items from the service server, and transmitting the game items to the end terminal.

In accordance with still another aspect of the present invention to accomplish the above object, there is provided a storage medium for storing the above game relay method using the mobile communication terminal in a form of a program.

Advantageous Effects

According to the present invention, there is provided a technology for allowing a network game to be played even using a terminal which has no function of connecting to a mobile communication network when the terminal can be connected to a mobile communication terminal, which is connected to a mobile communication network, over a personal area network.

Figure 1:
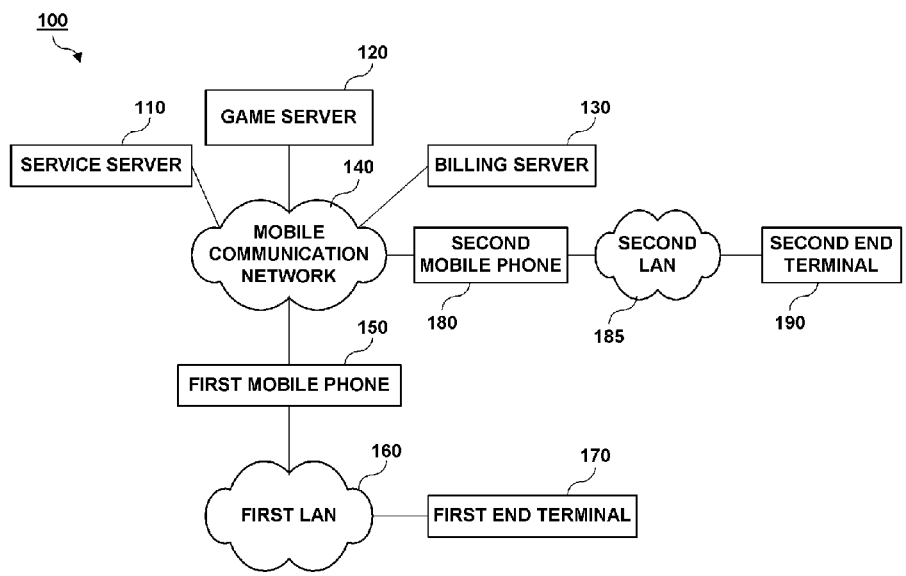
FIG. 1 is a block diagram of a game supply system according to an embodiment of the present invention

DESCRIPTION OF REFERENCE NUMERALS
OF PRINCIPAL ELEMENTS IN THE
DRAWINGS

100: game supply system
110: service server
120: game server
130: billing server
140: mobile communication network
150: first mobile communication terminal
160: first personal area network
170: first end terminal

MODE FOR THE INVENTION

Hereinafter, embodiments of the present invention will be described in detail with reference to the attached drawings. In the following description of the present invention, if detailed descriptions of related well-known constructions or functions are determined to make the gist of the present invention unclear, the detailed descriptions will be omitted. Further, the terms which will be described later are terms set in consideration of functions in relation to the present invention, and may vary according to a manufacturers intention or the usual practice. The terms should be defined based on the entire content of the present specification.

Figure 3:
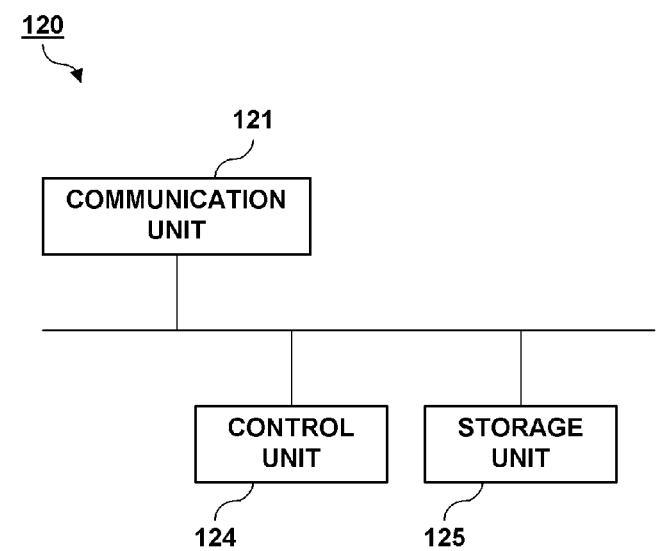
FIG. 3 is a detailed block diagram of the game server of FIG. 1.
Figure 5:
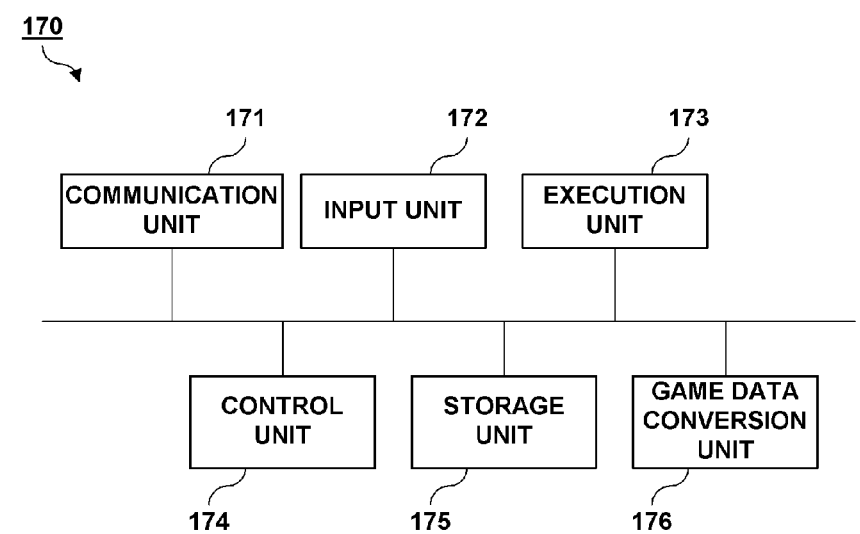
FIG. 5 is a detailed block diagram of the first end terminal of FIG. 1.

With reference to FIGS. 1, 3 and 5, a game supply system using a personal area network according to an embodiment of the present invention is described below.

FIG. 1 is a block diagram of a game supply system according to an embodiment of the present invention, FIG. 3 is a detailed block diagram of the game server of FIG. 1, and FIG. 5 is a detailed block diagram of the first end terminal of FIG. 1.

As shown in FIG. 1, a game supply system 100 using a personal area network according to the present embodiment is constructed such that a service server 110, a game server 120, a billing server 130, a first mobile communication terminal 150 and a second mobile communication terminal 180 are connected to each other through a mobile communication network 140, the first mobile communication terminal 150 and a first end terminal 170 are connected to each other through a first personal area network 160, and the second mobile communication terminal 180 and a second end terminal 190 are connected to each other through a second personal area network 185. Here, it should be noted that the first mobile communication terminal 150 and the second mobile communication terminal 180, the first personal area network 160 and the second personal area network 185, and the first end terminal 170 and the second end terminal 190 have the same respective constructions and perform the same respective operations.

The first end terminal 170 is connected to the first mobile communication terminal 150 through the first personal area network 160, and is configured to execute game data received from the game server 120 by requesting the game data from the game server. The first end terminal 170 may be implemented as a portable game console, or a Personal Digital Assistant (PDA), a notebook computer or a mobile communication terminal having a game function. The first personal area network 160 used at this time may be one of a wireless Personal Area Network, a Bluetooth network and an Ultra-wideband (UWB) network. With reference to FIG. 5, the construction of the first end terminal 170 is described in detail. A communication unit 171 transmits or receives data through the first personal area network 160. An input unit 172 receives a command from a user. An execution unit 173 executes game data. A control unit 174 controls the operations of respective components. A storage unit 175 stores game data, the unique identification (ID) information of the first end terminal 170, game items, etc. A game data conversion unit 176 converts game data, generated during the execution of a game, into data recognizable by the first mobile communication terminal 150.

The first mobile communication terminal 150 is connected to the first end terminal 170 through the first personal area network 160, and is connected to the service server 110 through the mobile communication network 140. The first mobile communication terminal 150 transfers data between the first end terminal 170 and the service server 110 and executes game data. For this operation, the first mobile communication terminal 150 is provided with a communication unit for communicating with the first personal area network 160 in addition to a communication unit for communication with the mobile communication network 140.

The service server 110 is connected to the first mobile communication terminal 150, the game server 120, and the second mobile communication terminal 180 through the mobile communication network 140, and is configured to authenticate the first end terminal 170, the first mobile communication terminal 150, the second end terminal 190 and the second mobile communication terminal 180 and to request the game server 120 to provide game data requested by an authenticated device. Further, the service server 110 collects game data executed by the first end terminal 170, the second end terminal 190, the first mobile communication terminal 150 and the second mobile communication terminal 180, and distributes the collected game data, thus synchronizing the game data.

The game server 120 is connected to the service server 110 though the mobile communication network 140, and provides game data requested by the first end terminal 170, the first mobile communication terminal 150, the second end terminal 190 and the second mobile communication terminal 180. With reference to FIG. 3, the game server 120 is described in detail. A communication unit 121 transmits or receives data through the mobile communication network 140. A control unit 124 controls the operations of respective components. A storage unit 125 stores game data and item data.

A billing server 130 is connected to the service server 110 through the mobile communication network 140, and performs billing on the first end terminal 170, the first mobile communication terminal 150, the second end terminal 190 and the second mobile communication terminal 180 when game data is provided by the game server 110 to them.

Meanwhile, it should be noted that the service server 110, the application server 120 and the billing server 130 may be connected to each other through a wired communication network (not shown) other than the mobile communication network 140. Furthermore, it should be noted that the application server 120 and the billing server 130 may be included in the service server 110 as individual components thereof.

Hereinafter, a game supply method using a personal area network according to an embodiment of the present invention is described with reference to FIGS. 6 to 10.

Figure 6:
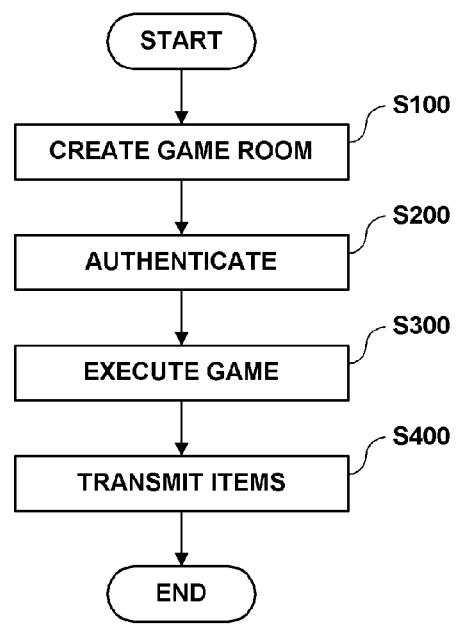
FIG. 6 is a flowchart of a game supply method according to an embodiment of the present invention
Figure 7:
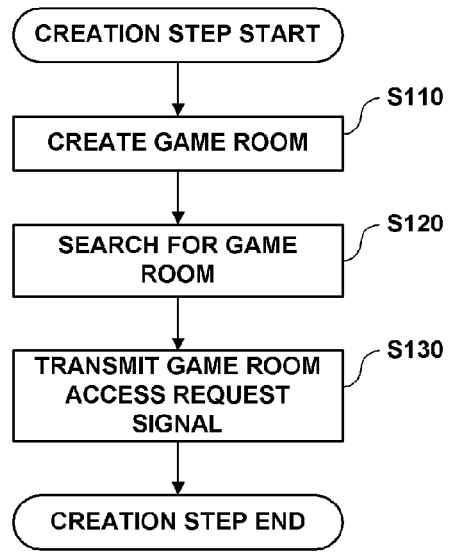
FIG. 7 is a detailed flowchart of the creation step of FIG. 6.
Figure 8:
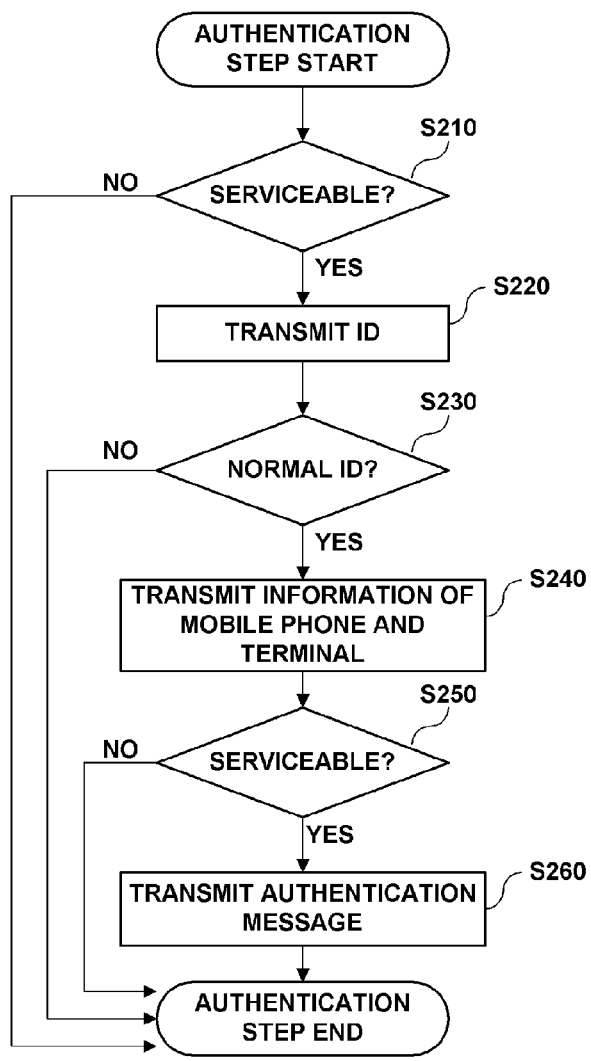
FIG. 8 is a detailed flowchart of the authentication step of FIG. 6
Figure 9:
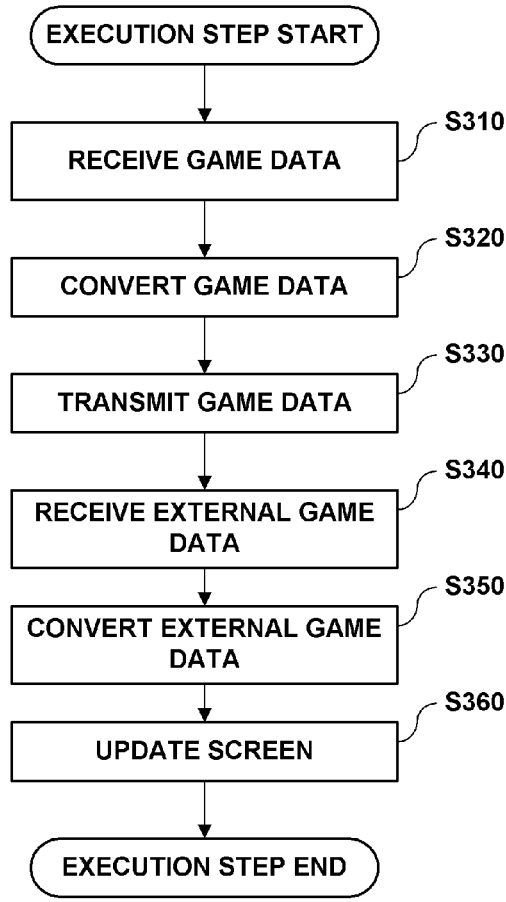
FIG. 9 is a detailed flowchart of the execution step of FIG. 6.
Figure 10:
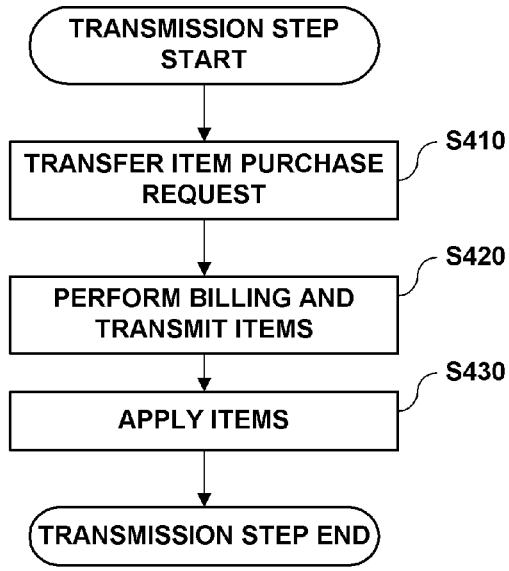
FIG. 10 is a detailed flowchart of the transmission step of FIG. 6.

FIG. 6 is a flowchart of a game supply method according to an embodiment of the present invention, FIG. 7 is a detailed flowchart of the creation step of FIG. 6, FIG. 8 is a detailed flowchart of the authentication step of FIG. 6, FIG. 9 is a detailed flowchart of the execution step of FIG. 6, and FIG. 10 is a detailed flowchart of the transmission step of FIG. 6.

As shown in FIG. 6, a game supply method using a personal area network according to the present embodiment (for convenience of description, hereinafter, the term game provision method using a personal area network is referred to briefly as a game supply method unless a particular description is made) includes a creation step S100, an authentication step S200, an execution step S300 and a transmission step S400.

The creation step S100 is the step at which the first mobile communication terminal creates a game room, and the first end terminal, the second mobile communication terminal and the second end terminal request access to the created game room from the first mobile communication terminal. With reference to FIG. 7, the creation step S100 will be described. At a first creation step S110, the first mobile communication terminal creates a game room.

At a second creation step S120, the first end terminal, the first mobile communication terminal and the second end terminal search for a created game room.

At a third creation step S130, the first end terminal, the first mobile communication terminal and the second end terminal transmit a game room access request signal to the first mobile communication terminal.

The authentication step S200 is the step at which the service server performs authentication for the provision of service on the first end terminal, the first mobile communication terminal, the second end terminal and the second mobile communication terminal. With reference to FIG. 8, the authentication step S200 will be described. At a first authentication step S210, the first mobile communication terminal examines whether the first end terminal, the second mobile communication terminal and the second end terminal are serviceable devices. At this time, examination items may be the specifications of respective hardware devices, information about whether the service server has registered authenticated devices, etc.

At a second authentication step S220, when the first end terminal, the second mobile communication terminal and the second end terminal are determined to be serviceable devices at the first authentication step, they transmit their unique ID information to the first mobile communication terminal.

At a third authentication step S230, the first mobile communication terminal determines whether the unique ID information of the first end terminal, the second mobile communication terminal, and the second end terminal is normal information. The determination of whether the unique ID information is normal information is made by examining whether the unique ID information conforms to the format of unique ID information designated by the service server.

At a fourth authentication step S240, if it is determined at the third authentication step that the unique ID information is normal information, the first mobile communication terminal transmits the unique ID information of the first mobile communication terminal, the first end terminal, the second mobile communication terminal and the second end terminal to the service server.

At a fifth authentication step S250, the service server determines whether the first mobile communication terminal, the first end terminal, the second mobile communication terminal and the second end terminal are in a serviceable state on the basis of the unique ID information and subscription information of each mobile communication terminal and each end terminal. The term "serviceable state" means the state in which the mobile communication terminals normally operate, and in which the hardware specifications of the devices have no problems with the performance of a service. Here, the hardware specifications of devices are preferably stored in the storage unit of the service server. Meanwhile, the above-described subscription information is required to determine whether relevant terminals are clients subscribing to a rate system available for the use of a service.

At a sixth authentication step S260, if it is determined at the fifth authentication step that the terminals are in the serviceable state, an authentication message is transmitted to the first mobile communication terminal, the first end terminal, the second mobile communication terminal and the second end terminal.

The execution step S300 is the step at which the first end terminal, the first mobile communication terminal, the second end terminal and the second mobile communication terminal execute game data received from the service server. With reference to FIG. 9, the execution step S300 is described in detail. At a first execution step S310, the first mobile communication terminal receives game data from the service server and transfers the game data to the first end terminal, and the second mobile communication terminal receives game data from the service server and transfers the game data to the first end terminal. When the game data has been transmitted, the service server notifies the billing server of the transmission of the game data. Accordingly, the billing server additionally stores billing information generated for one or more of the first end terminal, the first mobile communication terminal, the second end terminal and the second mobile communication terminal.

At a second execution step S320, the first end terminal converts game data, generated during the execution of a game, into data recognizable by the first mobile communication terminal, and transfers the converted data to the first mobile communication terminal, and the second end terminal converts game data, generated during the execution of a game into data recognizable by the first mobile communication terminal and transfers the converted data to the first mobile communication terminal. Because of this step, the compatibility of data between the mobile communication terminal and the end terminal, which are not homogenous terminals, is possible. In this regard, it should be noted that the conversion of data may be performed by the service server rather than the end terminal or the mobile communication terminal. For this operation, the service server, for example, may collect all of the data, convert the data, and subsequently retransmit the converted data to respective end terminals and mobile communication terminals.

At a third execution step S330, the first mobile communication terminal transmits both game data, generated during the execution of a game, and the game data, received from the first end terminal, to the service server, and the second communication terminal transmits game data, generated during the execution of a game, and the game data, received from the second end terminal, to the service server.

At a fourth execution step S340, the service server converts the game data received from the first mobile communication terminal into data recognizable by the second mobile communication terminal, transmits the converted data to the second mobile communication terminal, converts the game data received from the second mobile communication terminal into data recognizable by the first mobile communication terminal, and transmits the converted data to the first mobile communication terminal. Through this step, the compatibility of data between the first and second mobile communication terminals, which are not homogenous terminals, is possible.

At a fifth execution step S350, the first mobile communication terminal converts the data received from the service server into data recognizable by the first end terminal and transmits the converted data, and the second mobile communication terminal-converts the data received from the service server into data recognizable by the second end terminal and transmits the data.

At a sixth execution step S360, the first mobile communication terminal, the first end terminal, the second mobile communication terminal and the second end terminal update a game screen on the basis of the received game data.

The transmission step S400 is the step at which the first end terminal, the first mobile communication terminal, the second end terminal and the second mobile communication terminal request game items from the service server, and the service server provides the game items. With reference to FIG. 10, the transmission step S400 will be described in detail. At a first transmission step S410, the first mobile communication terminal transfers both an item purchase request made by the first end terminal to the first mobile communication terminal, and an item purchase request generated by the first mobile communication terminal, to the service server, and the second mobile communication terminal transfers both an item purchase request made by the second end terminal to the second mobile communication terminal, and an item purchase request generated by the second mobile communication terminal, to the service server at step S410.

At a second transmission step S420, the service server notifies the game server of the item requests, the game server transmits the requested items to the service server, and the service server transfers items to the first mobile communication terminal and the second mobile communication terminal. At this time, it should be noted that the billing server may perform billing attributable to the use of items.

At a third transmission step S430, the first mobile communication terminal, the first end terminal, the second mobile communication terminal and the second end terminal apply the received items to the game.

Hereinafter, with reference to FIGS. 2 and 11, the construction and operation of a service server for relaying games according to an embodiment of the present invention will be described.

Figure 2:
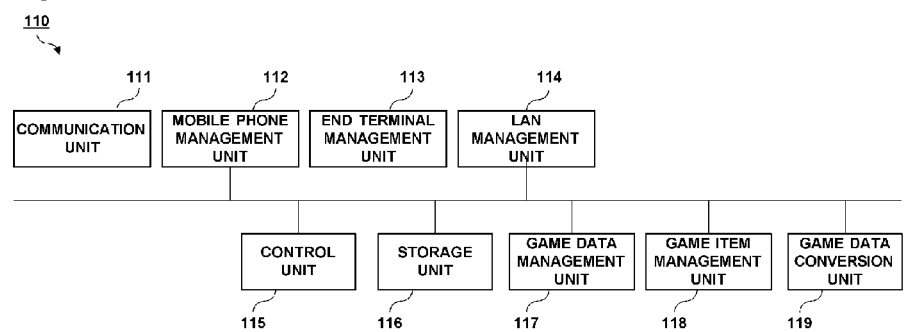
FIG. 2 is a detailed block diagram of the service server of FIG. 1.
Figure 11:
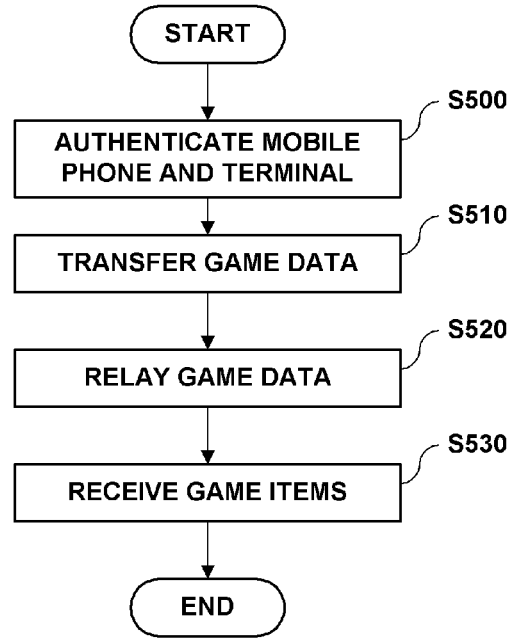
FIG. 11 is a flowchart of a relay method using a service server according to an embodiment of the present invention and FIG. 12 is a flowchart of a relay method using a mobile communication terminal according to an embodiment of the present invention.

FIG. 2 is a detailed block diagram of the service server of FIG. 1, and FIG. 11 is a flowchart showing a relay method using a service server according to an embodiment of the present invention.

As shown in FIG. 2, in a service server 110 for relaying games (hereinafter, for convenience of description, the term service server for relying games is referred to briefly as a service server unless a particular description is made) according to the present embodiment, a communication unit 111 transmits or receives data through a mobile communication network.

A mobile communication terminal management unit 112 manages information of mobile communication terminals received through the communication unit 111. The managed mobile communication terminal information may include the types of mobile communication terminals, hardware specifications, information of mobile communication terminal users, etc.

An end terminal management unit 113 manages information of end terminals received through the communication unit 111. The managed end terminal information may include the types of end terminals, hardware specifications, the unique accounts of the end terminals, etc.

A personal area network management unit 114 manages information of personal area networks for relaying communication between the mobile communication terminals and the end terminals. The managed personal area network information may include the standards of communication networks, log-in account information when login is required, etc.

A game data management unit 117 manages game data received from the mobile communication terminals and the game server.

A storage unit 116 stores the mobile communication terminal information, the end terminal information, the personal area network information, and the game data.

A game item management unit 118 manages game items received from the game server.

A game data conversion unit 119 converts the game data received from the game server into data recognizable by the mobile communication terminals.

A control unit 115 controls the operations of respective components, authenticates the mobile communication terminals and the end terminals on the basis of the mobile communication terminal information and the end terminal information, allows the communication unit 111 to transfer the game data received from the game server to the mobile communication terminals, controls the conversion operation of the game data conversion unit 119 on the basis of the mobile communication terminal information of the mobile communication terminal management unit, and controls the communication unit 111 so that games items corresponding to the requests made by the mobile communication terminals are transferred to the mobile communication terminals.

Hereafter, with reference to FIG. 11, the relay method using the service server will be described.

At a first step S500, the service server authenticates each mobile communication terminal and each end terminal.

At a second step S510, the service server transmits game data to the mobile communication terminal.

At a third step S520, the service server receives game data generated during the execution of a game from the mobile communication terminal and the end terminal and transmits the received game data to another mobile communication terminal which is executing an identical game. Here, the received game data is preferably transmitted after being converted into data recognizable by a mobile communication terminal which will receive the game data.

At a fourth step S530, the service server receives game item requests made by the mobile communication terminal and the end terminal from the mobile communication terminal, receives requested game items from the game server, and provides the received game items to the mobile communication terminal.

Meanwhile, such a game relay method using the service server is stored in a storage medium in the form of a program.

Hereinafter, with reference to FIGS. 4 and 12, the construction and operation of a mobile communication terminal for relaying games according to an embodiment of the present invention will be described.

Figure 4:
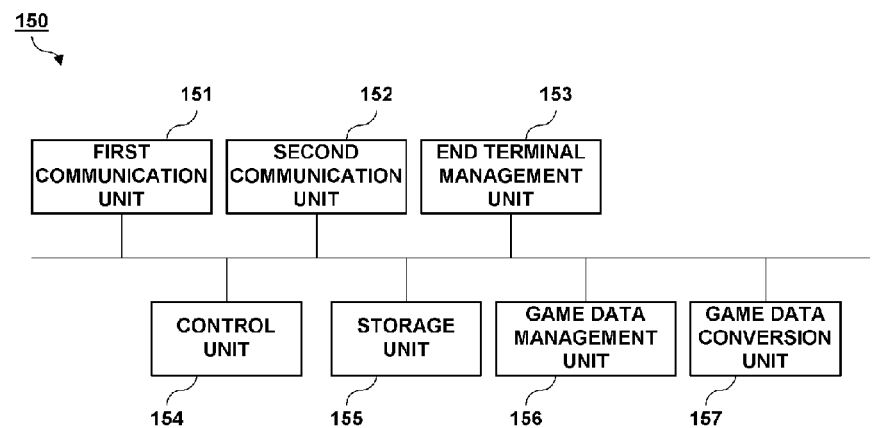
FIG. 4 is a detailed block diagram of the first mobile communication terminal of FIG. 1.
Figure 12:
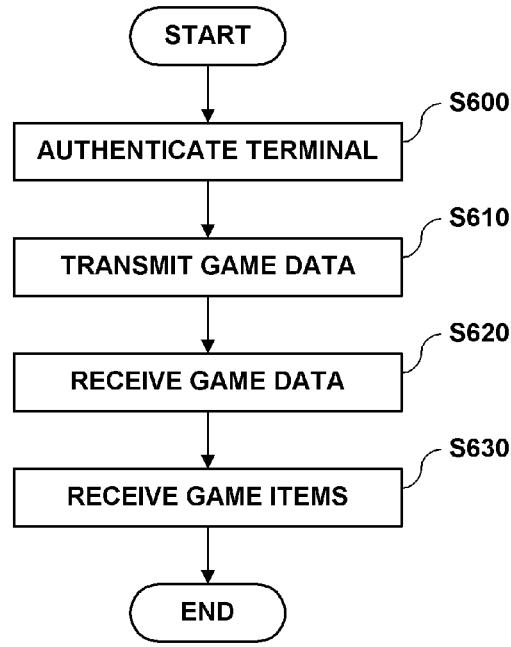

FIG. 4 is a detailed block diagram of the first mobile communication terminal of FIG. 1, and FIG. 12 is a flowchart of a relay method using a mobile communication terminal according to an embodiment of the present invention.

As shown in FIG. 4, in a mobile communication terminal 150 for relaying games according to the present embodiment (hereinafter, for convenience of description, the term mobile communication terminal for relaying games is referred to briefly as a mobile communication terminal unless a particular description is made), a first communication unit 151 transmits or receives data through a mobile communication network.

A second communication unit 152 transmits or receives data through a personal area network. In order to cope with the various types of personal area networks, the second communication unit 152 can cope with the communication standards of two or more personal area networks.

An end terminal management unit 153 manages information of each end terminal received through the second communication unit 152.

A storage unit 155 stores the end terminal information and game data.

A game data management unit 156 manages game data received from the service server and the end terminal.

A game data conversion unit 157 converts the game data received from the service server into data recognizable by the end terminal.

A control unit 154 controls the operations of respective components, determines whether the end terminal is serviceable and whether unique ID information is normal information, controls the first communication unit 151 and the second communication unit 152 so that game data is transferred to the end terminal and so that the game data, generated during the execution of a game by the end terminal and the mobile communication terminal, is transmitted to the service server, and controls the operation of the game data conversion unit 157 on the basis of the end terminal information.

Hereinafter, a game relay method using a mobile communication terminal will be described with reference to FIG. 12.

At a first step S600, the mobile communication terminal authenticates each end terminal.

At a second step S610, the mobile communication terminal receives game data from the service server and transmits the game data to the end terminal.

At a third step S620, the mobile communication terminal receives game data, generated during the execution of a game by the end terminal, transfers the game data to the service server, and receives game data, transferred from another mobile communication terminal which is executing an identical game to the service server, from the service server.

At a fourth step S630, the mobile communication terminal transfers both a game item request received from the end terminal and the game item request made by the mobile communication terminal to the service server, receives game items from the service server, and transmits the game items to the end terminal.

Meanwhile, the game relay method using the mobile communication terminal is stored in a storage medium in the form of a program.

As described above, the embodiments of the present invention have been described with reference to the attached drawings.

However, it should be noted that the present invention is not especially limited to the above-described embodiments, and various changes and modifications are possible by those skilled in the art within the spirit and scope of the accompanying claims, according to the circumstances.

The invention claimed is:

1. A game supply system comprising:
a first end terminal;
a first mobile communication terminal connected to the first end terminal through a first personal area network; and
a service server connected to the first mobile communication terminal through a mobile communication network;
wherein the first end terminal is configured to:
transmit a unique ID information of the first end terminal to the first mobile communication terminal for authentication by the service server,
receive game data from the first mobile communication terminal,
generate a first game data during execution of the received game data, and
transmit the first generated game data to the first mobile communication terminal,
wherein the first mobile communication terminal is configured to:
transmit a unique ID information of the first mobile communication terminal and the received unique ID information of the first end terminal to the service server,
receive the game data from the service server when successful authentication is performed by the service server,
transmit the received game data to the first end terminal simultaneously with generation of a second game data during execution of the received game data,
receive the first generated game data from the first end terminal;
transmit the received first generated game data and the second generated game data to the service server, and
wherein the service server is configured to:
receive the unique ID information of the first mobile communication terminal and the unique ID information of the first end terminal from the first mobile communication terminal,
authenticate both the first mobile communication terminal and the first end terminal based on the received corresponding ID information,
request a game server to provide the game data,
receive the game data from the game server,
transmit the received game data to the first mobile communication terminal, and
receive the first and the second generated game data from the first mobile communication terminal.

2. The game supply system according to claim 1, further comprising a billing server connected to the service server through the mobile communication network
wherein the billing server performs billing on the first end terminal and the first mobile communication terminal for game data provided by the game server to the first end terminal and the first mobile communication terminal.

3. The game supply system according to claim 1, further comprising:
a second mobile communication terminal is connected to the service server through the mobile communication network;
wherein the second mobile communication terminal is configured to
receive the first and second generated game data from the service server, and
update a game screen on a basis of the received first and second game data.

4. The game supply system according to claim 3, wherein the second mobile communication terminal is further configured to
receive the game data from the service server when successful authentication is performed by the service server,
generate a third game data during execution of the received game data, and
transmit the third game data to the service server so that the third game data is transmitted to the first mobile communication terminal.

5. The game supply system according to claim 3, further comprising:
a second end terminal connected to the second mobile communication terminal through a second personal area network;
wherein the second end terminal is configured to execute the same game data received from the second mobile communication terminal.

6. A game supply system comprising:
a first end terminal;
a first mobile communication terminal connected to the first end terminal through a first personal area network;
a service server connected to the first mobile communication terminal through a mobile communication network; and
a game server connected to the first mobile communication terminal and the service server through the mobile communication network,
wherein the first end terminal is configured to:
  transmit a unique ID information of the first end terminal to the first mobile communication terminal for authentication by the service server,
  receive game data from the first mobile communication terminal,
  generate a first game data during execution of the received game data, and
  transmit the first game data to the first mobile communication terminal,
wherein the first mobile communication terminal is configured to:
  receive the unique ID information of the first end terminal,
  transmit a unique ID information of the first mobile communication terminal and the received unique ID information of the first end terminal to the service server,
  receive the game data from the game server when successful authentication is performed by the service server,
  transmit the received game data to the first end terminal simultaneously with generation of a second game data during execution of the received game data,
  receive from the first end terminal the first game data; and
  transmit the received first game data and the second game data to the service server,
wherein the service server is configured to:
  receive the unique ID information of the first mobile communication terminal and the unique ID information of the first end terminal from the first mobile communication terminal,
  authenticate each of the first mobile communication terminal and the first end terminal based upon the received corresponding ID information,
  request the game server to provide the game data to the first mobile communication terminal, and
  receive the first and second generated game data from the first mobile communication terminal, and
wherein the game server is configured to:
  receive a request for the game data from the service server; and
  transmit the game data to the first mobile communication terminal in response to the request from the service server.

7. A game supplying method comprising steps of:
by a first end terminal, transmitting a unique ID information of the first end terminal to a first mobile communication terminal for authentication by a service server,
by the first mobile communication terminal, receiving the unique ID information of the first end terminal;
by the first mobile communication terminal, transmitting a unique ID information of the first mobile communication terminal and the received unique ID information of the first end terminal to the service server,
by the service server, receiving from the first mobile communication terminal, the unique ID information of the first mobile communication terminal and the unique ID information of the first end terminal,
by the service server, authenticating each of the first mobile communication terminal and the first end terminal based upon the received corresponding ID information,
by the service server, requesting a game server to provide game data,
by the service server, receiving the game data from the game server,
by the service server, transmitting the received game data to the first mobile communication terminal,
by the first mobile communication terminal, transmitting the received game data to the first end terminal simultaneously with generation of a second game data during execution of the received game data,
by the first end terminal, receiving the game data from the first mobile communication terminal,
by the first end terminal, generating a first game data during execution of the received game data from the first mobile communication,
by the first end terminal, transmitting the first generated game data to the first mobile communication terminal,
by the first mobile communication terminal, receiving the first generated game data and transmitting the received first generated game data and the second generated game data to the service server, and
by the service server, receiving the first and second generated game data from the first mobile communication terminal.

8. The game supplying method of claim 7, further comprising steps of:
by the service server, transmitting the first game data and the second game data to a second mobile communication terminal connected to the service server through the mobile communication network,
by the second mobile communication terminal, receiving the first and second generated game data from the service server, and
by the second mobile communication terminal, updating a game screen on a basis of the received first and second generated game data.

* * * * *